(12) United States Patent
Tonkin et al.

(10) Patent No.: US 7,166,224 B2
(45) Date of Patent: Jan. 23, 2007

(54) WATER PURIFICATION APPARATUS

(75) Inventors: Mark Christopher Tonkin, Lewes (GB); Mark Andrew Young, Bewdley (GB); Olaf Norbert Kirchner, Genolier (CH)

(73) Assignee: Design Technology and Innovation Limited, London (GB)

( * ) Notice: Subject to any disclaimer, the term of this patent is extended or adjusted under 35 U.S.C. 154(b) by 0 days.

(21) Appl. No.: 10/718,845

(22) Filed: Nov. 21, 2003

(65) Prior Publication Data
US 2004/0124145 A1 Jul. 1, 2004

Related U.S. Application Data

(60) Division of application No. 09/878,886, filed on Jun. 11, 2001, now Pat. No. 6,793,824, which is a continuation of application No. 09/250,776, filed on Feb. 12, 1999, now abandoned, which is a continuation-in-part of application No. 09/019,287, filed on Feb. 5, 1998, now abandoned.

(51) Int. Cl.
*B01D 15/00* (2006.01)
*A01G 9/10* (2006.01)
*B01D 59/12* (2006.01)

(52) U.S. Cl. .............. 210/640; 47/79; 47/80; 47/81; 47/83; 47/85

(58) Field of Classification Search .......... 210/640, 210/321.6, 321.8; 47/66.7, 58.1, 48.5, 75, 47/79, 80–81, 65.7, 59, 83, 85; 202/234, 202/197; 442/77; 45/79; 48/48.5, 65.5, 48/65.7; 95/52

See application file for complete search history.

(56) References Cited

U.S. PATENT DOCUMENTS

| 2,222,815 A | 11/1940 | Johnson ............ 47/58.1 |
| 2,315,949 A | 4/1943 | Fischer ............ 47/58.1 |
| 2,814,161 A | 11/1957 | Hawkins ............ 47/80 |
| 2,904,479 A | 9/1959 | Mccord et al. |
| 3,415,719 A | 12/1968 | Telkes |
| 3,534,497 A | 10/1970 | Hornbostel ............ 47/77 |
| 3,648,845 A | 3/1972 | Riley |

(Continued)

FOREIGN PATENT DOCUMENTS

DE 29 08 479 8/1980

(Continued)

OTHER PUBLICATIONS

PCT International Search Report dated Sep. 17, 1999.

(Continued)

*Primary Examiner*—Ana Fortuna
(74) *Attorney, Agent, or Firm*—Ohlandt, Greeley, Ruggiero & Perle, L.L.P.

(57) ABSTRACT

The present invention relates to the use of a hydrophilic membrane to provide by the process of pervaporation through the membrane water suitable for agricultural irrigation, industrial use, hydrating or rehydrating of food or agricultural or pharmaceutical compositions. The present invention also relates to a water purification apparatus which includes the hydrophilic membrane, comprising one or more layers of hydrophilic polymers, to purify water which may contain suspended or dissolved impurities and solids, including but not limited to seawater, brackish water and other kinds of polluted water.

60 Claims, 4 Drawing Sheets

U.S. PATENT DOCUMENTS

| | | | | |
|---|---|---|---|---|
| 3,858,499 | A | 1/1975 | Scott | |
| 4,034,506 | A | 7/1977 | Kasahara et al. | 47/64 |
| 4,096,663 | A | 6/1978 | Silver | 47/80 |
| 4,098,021 | A | 7/1978 | Gruber | 47/78 |
| 4,182,582 | A | 1/1980 | Youval et al. | |
| 4,216,623 | A | 8/1980 | Silver | 47/80 |
| 4,493,870 | A | 1/1985 | Vrouenraets et al. | |
| 4,517,316 | A | 5/1985 | Mason | |
| 4,661,254 | A | 4/1987 | Zupancic et al. | 210/490 |
| 4,698,135 | A | 10/1987 | Raab | 202/234 |
| 4,698,372 | A | 10/1987 | Moss | |
| 4,725,481 | A | 2/1988 | Ostapchenko | |
| 4,769,273 | A | 9/1988 | Hoeschele et al. | |
| 4,805,343 | A * | 2/1989 | Patterson et al. | 47/79 |
| 4,832,690 | A | 5/1989 | Kuu | |
| 4,908,984 | A | 3/1990 | Lenke | 47/65.5 |
| 4,920,105 | A | 4/1990 | Zelman | |
| 4,926,585 | A | 5/1990 | Dreschel | |
| 4,939,865 | A | 7/1990 | Whitcomb et al. | 47/77 |
| 4,978,505 | A | 12/1990 | Kertz | |
| 5,067,272 | A | 11/1991 | Constantz | 47/48.5 |
| 5,348,691 | A | 9/1994 | McElroy et al. | |
| 5,374,138 | A | 12/1994 | Byles | |
| 5,383,943 | A | 1/1995 | Ogawa et al. | 47/66.7 |
| 5,522,790 | A * | 6/1996 | Moll et al. | 600/204 |
| 5,534,150 | A | 7/1996 | Bastioli et al. | |
| 5,547,586 | A | 8/1996 | Halperin et al. | |
| 5,595,662 | A | 1/1997 | Sanderson | |
| 5,657,577 | A | 8/1997 | Rodder | |
| 5,664,369 | A | 9/1997 | Kertz | 47/65 |
| 5,753,008 | A | 5/1998 | Friesen et al. | |
| 5,860,245 | A | 1/1999 | Welch et al. | 47/56 |
| 5,890,703 | A | 4/1999 | Kaus et al. | |
| 5,951,204 | A | 9/1999 | Roberts et al. | 405/128.45 |
| 5,974,735 | A | 11/1999 | Behrens | 47/58.1 |
| 5,989,697 | A * | 11/1999 | Gebben et al. | 428/315.5 |
| 6,102,204 | A | 8/2000 | Castleberry | 206/423 |
| 6,173,531 | B1 | 1/2001 | Howell | 47/73 |
| 6,187,696 | B1 * | 2/2001 | Lim et al. | 442/77 |
| 6,453,610 | B2 * | 9/2002 | Tonkin et al. | 47/66.7 |
| 6,484,439 | B1 * | 11/2002 | Tonkin et al. | 47/48.5 |
| 6,511,052 | B1 * | 1/2003 | Tonkin et al. | 261/101 |
| 6,615,537 | B2 * | 9/2003 | Tonkin et al. | 47/66.7 |
| 6,679,991 | B1 * | 1/2004 | Van Andel | 210/321.6 |
| 6,793,824 | B2 * | 9/2004 | Tonkin et al. | 210/640 |
| 6,887,385 | B2 * | 5/2005 | Tonkin et al. | 210/640 |

FOREIGN PATENT DOCUMENTS

| | | |
|---|---|---|
| DE | 40 24 405 A1 | 2/1992 |
| EP | 0 238 941 A1 | 9/1987 |
| EP | 0 238 941 B1 | 9/1987 |
| EP | 0 268 556 B1 | 5/1988 |
| EP | 0 521 726 A | 1/1993 |
| EP | 0622488 A1 | 4/1994 |
| EP | 0 154 971 B1 | 9/1995 |
| EP | 0 791 620 A2 | 8/1997 |
| EP | 0 808 657 A2 | 11/1997 |
| FR | 2 746 255 | 9/1997 |
| GB | 2 265 536 A | 10/1993 |
| SU | 1648291 A1 | 5/1991 |
| WO | WO 95 03033 | 2/1995 |
| WO | WO 95/24260 A1 | 9/1995 |
| WO | WO 99/40031 A1 | 8/1999 |
| WO | WO 00/28807 | 5/2000 |

OTHER PUBLICATIONS

Patent Abstracts of Japan.

E. Korngold et al., "Water desalination by pervaporation with hollow fiber membranes", Desalination, vol. 107, No. 2, (1996) 121-129.

ASTM Designation: E96-95, Standard Test Methods for Water Vapor Transmission of Materials, May 1995, pp. 719-726.

Japanese PatentAbstract, JP04063522 A, Eisai Seikaken KK and Nitto Denco Corp., Oct. 6, 1993.

Japanese Patent Abstract, JP11-189726 A, Mitsui Petrochem Ind. Co. Ltd., "High Oxygen and Moisture Permeable Resin Composition for Films", Jul. 13, 1999.

* cited by examiner

WATER PURIFICATION APPARATUS

CROSS REFERENCED TO RELATED APPLICATIONS

This application is a divisional of U.S. application Ser. No. 09/878,886, filed Jun. 11, 2001 now U.S. Pat. No. 6,793,824, which is a continuation of U.S. application Ser. No. 09/250,776, filed Feb. 12, 1999, now abandoned, which is a continuation-in-part of application Ser. No. 09/019,287, filed Feb. 5, 1998, now abandoned, all of which are hereby incorporated herein by reference.

BACKGROUND

1. Field of the Invention

This invention relates to the purification and controlled release of water by pervaporation, and specifically relates to the use of a hydrophilic membrane in an apparatus that allows the direct use of pure or impure water for irrigation, rehydration or drinking.

2. Description of the Related Art

There are known processes for purifying water, and the type of process used depends on the nature and amount of the impurities in the water. For example, impurities in particulate form and in solution may both need to be removed from the water. The aim is to purify the water so that it contains sufficiently low amounts of suspended particles, suspended microbes and dissolved salts to meet the quality requirements of water for drinking, for the production of food and drink, for agricultural irrigation and for industrial use.

Processes for the purification of water are usually classified as filtration, distillation or reverse osmosis. In conventional particle filtration processes, impurities in particulate form, such as suspended inorganic particles, are removed using porous constructions such as woven or non-woven fabrics. In cases where very small particles must be filtered, polymer membranes are used which are microporous, that is, the membranes have very small holes through which the particulates to be filtered cannot pass.

Aqueous solutions containing dissolved salts are usually purified by reverse osmosis or distillation. When the aqueous solution is in the form of seawater or brackish water, these processes are generally known as desalination. The process of reverse osmosis relies on applying pressure to solutions of ions across a semi-permeable membrane. If the applied pressure is greater than the osmotic pressure of the solution, purified water is collected from the side of the membrane not in contact with the solution. Reverse osmosis membranes let water pass through them but reject the passage of salt ions. In reality a small percentage, say 1%, of sea salts pass through the membranes. U.S. Pat. No. 5,547,586 discloses a method to desalinate seawater and brackish water utilizing an enzyme-assisted membrane. As opposed to reverse osmosis, distillation methods using seawater or brackish water can yield water with a very low amount of suspended particles and dissolved solids. However, the high latent heat of vaporization of water means that distillation processes require a high input of energy and therefore generally operate at a higher cost compared to reverse osmosis processes.

It has been known from U.S. Pat. No. 4,725,481 that a copolyetherester elastomer can be used, on its own or as a part of a bicomponent film of a hydrophobic layer and a hydrophilic layer of copolyetherester elastomers bonded together, to permit the differential transfer of water vapor to prevent buildup of moisture such as in a surgical drape or in waterproof apparel equipment.

SUMMARY OF THE INVENTION

The present invention generally relates to a method and an apparatus for the purification and/or the controlled release of water by pervaporation, by passing water vapor contained in air, or liquid water that may contain suspended or dissolved impurities, including but not limited to seawater, brackish water or other kinds of polluted water, through one or more layers of hydrophilic membranes to remove impurities from the water.

The layer or layers of hydrophilic membranes may be present either in the form of an unsupported structure or coated on or adhered to a support material, wherein the hydrophilic membrane layer can be a copolyetherester elastomer, a polyether-block-polyamide, a polyether urethane, homopolymers or copolymers of polyvinyl alcohol, or mixtures thereof.

A preferred hydrophilic membrane layer is made from a hydrophilic polymer having a water vapor transmission rate according to ASTM E96-95 (Procedure BW) of at least 400 $g/m^2/24$ h, measured using air at 23° C. and 50% relative humidity at a velocity of 3 m/s on a film of total thickness 25 microns. A more preferred hydrophilic membrane layer is made from a hydrophilic polymer having a water vapor transmission rate according to ASTM E96-95 (Procedure BW) of at least 3500 $g/m^2/24$ h, measured using air at 23° C. and 50% relative humidity at a velocity of 3 m/s on a film of total thickness 25 microns.

DETAILED DESCRIPTION

Figure 1:
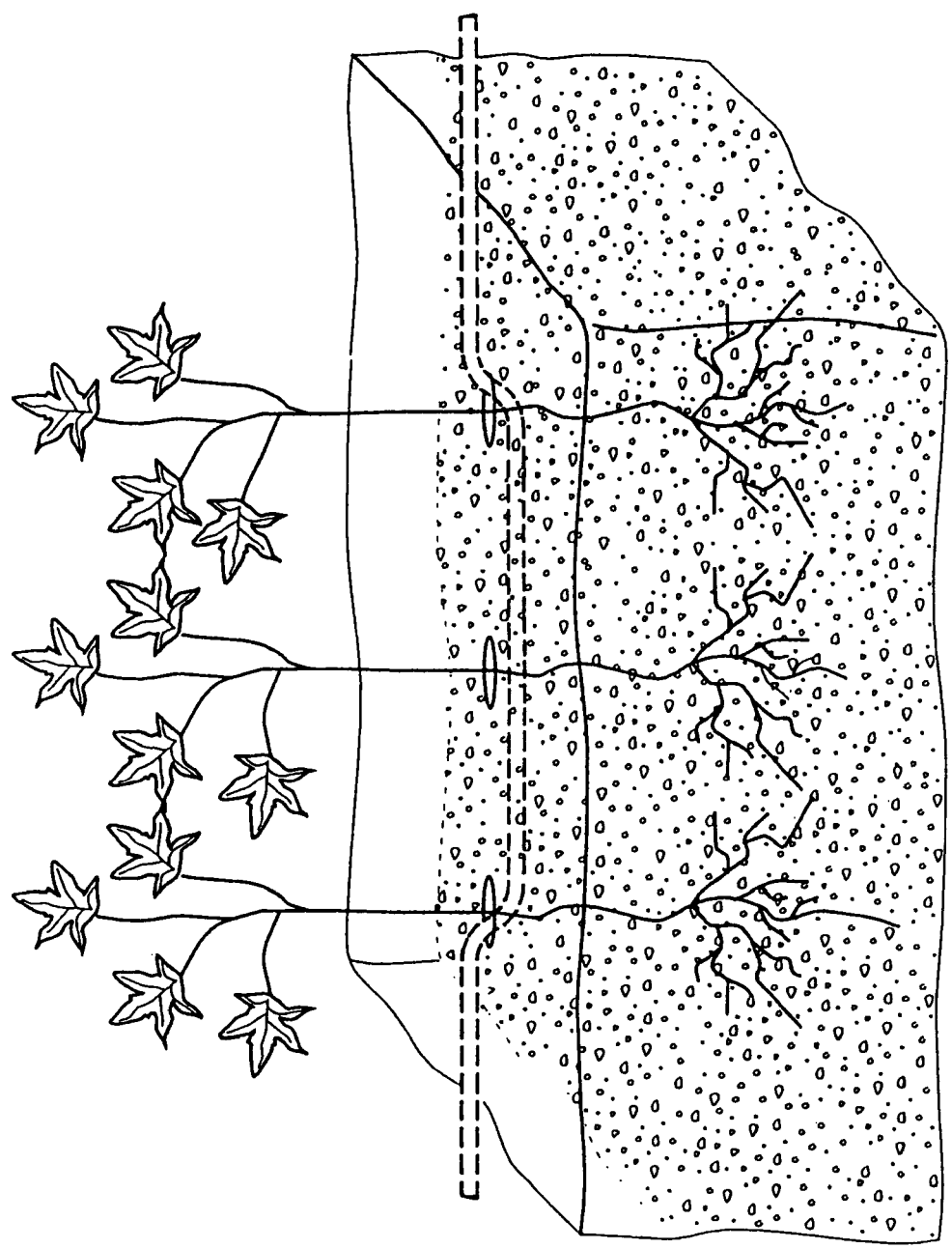
FIGS. 1 and 2 are explanatory drawings of plants growing in "grow-bags" and watered conventionally or using irrigation bags in Examples 11–14.

The present invention generally relates to a method and an apparatus for the purification and/or the controlled release of water by pervaporation, by passing water vapor contained in air, or liquid water that may contain suspended or dissolved impurities, including but not limited to seawater, brackish water or other kinds of polluted water, through one or more layers of hydrophilic membrane to remove impurities from the water. The layer or layers of hydrophilic membrane may be present either in the form of an unsupported structure or coated on or adhered to a support material.

Pervaporation is the process wherein a given solvent permeates into a non-porous membrane or coating, is transported across the membrane and is subsequently released from the opposite face of the membrane or coating in the form of vapor. Pervaporation is therefore different from known filtration, distillation or reverse osmosis processes in that the product is a vapor and not a liquid. If the solvent is water, non-porous hydrophilic membranes are suitable for pervaporation, because water is readily absorbed by, transported across and released from such a membrane. This water vapor can then be used for applications such as providing moisture to a plant growing medium or the air space of a growth chamber, to hydrate dry matter or to rehydrate dehydrated matter, or else it may be condensed for further use as liquid water.

Hydrophilic Membranes

"Hydrophilic membranes" means non-porous membranes that absorb water, i.e., that allow water to pass through. If there is a humidity gradient across the hydrophilic membrane, this absorbed water may diffuse through the thickness of the membrane and may be emitted from its opposite face. Hydrophilic membranes or coatings, hereinafter collectively referred to as membranes in this disclosure, feature sufficiently high water vapor transmission rates, as defined below, so that water that has passed through the membranes can be used directly in applications including but not limited to irrigating plants and rehydrating food, drinks, drugs and the like. Such membranes can comprise one or more individual layers made from materials including but not limited to the same or different hydrophilic polymers. As long as the water vapor permeation rate of the membrane in total is sufficiently high, this water can be provided at a rate consistent with its use in a given practical application as described. The non-porous nature of the membranes disclosed here serves to exclude any particulate impurities from passing through such a membrane, including microbes such as bacteria and viruses. In addition, it has been discovered that membranes made from the hydrophilic polymers described in the present invention significantly reduce or prevent the passage of dissolved salts. Therefore, the ability to use not only freshwater, but also water that may contain suspended or dissolved impurities, to produce desired amounts of purified water by pervaporation allows saline water, including but not limited to seawater or brackish water, after processing through the apparatus embodying the present invention, to be used to irrigate agricultural land and sustain plant growth, and/or for the controlled release of water into an environment.

The rate at which water pervaporates through the membrane made from the hydrophilic polymer depends, among other factors, upon the moisture content on the non-water side. Therefore, irrigation systems based on the membranes of the present invention are self-regulating and may be "passive" in nature, providing more water to plants under dry conditions and less under humid conditions.

In a similar way as described for the applications in agricultural irrigation above, the pervaporation of water through the membrane according to the present invention is sufficient to rehydrate dried foods, pharmaceutical products and the like, irrespective of whether the water on the opposite face of the membrane is freshwater or water that may contain suspended or dissolved impurities. If the water is required in liquid form, such as for applications including but not limited to the production of drinking water or for use in industry, the water vapor produced by pervaporation through the membrane can be condensed to liquid water.

Water Vapor Transmission Characteristics

The standard test for measuring the rate at which a given membrane transmits water is ASTM E-96-95—Procedure BW, previously known and named as ASTM E-96-66—Procedure BW, which is used to determine the Water Vapor Transmission Rate (WVTR) of a membrane. For this test, an assembly is used based on a water-impermeable cup, also called a "Thwing-Albert Vapometer". This cup contains water to about $3/4 \pm 1/4$ in. (19±6 mm) from top. The opening of the cup is sealed watertight with a water-permeable membrane of the test material to be measured, leaving an air gap between the water surface and the membrane. In Procedure BW, the cup is then inverted, so that water is in direct contact with the membrane. The apparatus is placed in a test chamber at a controlled temperature and humidity, and air is then blown across the outside of the membrane at a specified velocity. Experiments are run in duplicate. The weights of the cup, water and membrane assemblies are measured over several days and results are averaged. The rate at which water permeates through the membrane is quoted as its "Water Vapor Transmission Rate," measured as the average weight loss of the assembly at a given membrane thickness, temperature, humidity and air velocity, expressed as mass loss per unit membrane surface area and time. The WVTR of membranes or films according to ASTM E96-95 Method BW is typically measured on a film of thickness of 25 microns and at an air flow rate of 3 m/s, air temperature of 23° C. and 50% relative humidity.

Under the conditions of the plant growing experiments embodying the invention, a selection of which are detailed in Examples 15–19 below, irrigation bags made from the membrane were used to provide water to the growing plants. In the experiments carried out to date, a rate of water transfer of 10 g/24 h (equivalent to 70 g/m$^2$/24 h) through an irrigation bag was found to be sufficient to sustain the growth of one or more plants. This rate of water transfer needed to sustain plant growth can be expressed as a rate at which water passed through unit surface area of the membrane used in the experiments over unit time, which is reported as the "Average Water Transfer Rate" for the purposes of this disclosure. Under the conditions of plant growing experiments embodying the invention, a selection of which are detailed in Examples 15–19 below, an Average Water Transfer Rate of 70 g/m$^2$/24 h or more was found to be sufficient to sustain the growth of a plant, as shown in Tables 2–6.

In these experiments, the conditions under which water was transferred from the inside of the irrigation bags across the membrane into the plant growing medium and into the plant roots were from irrigation bags buried in the growing medium, in the absence of air movement at the surface of the irrigation bags. Under these conditions, water vapor moved from within the irrigation bag across the membrane and into the growing medium only by diffusion.

Hydrophilic Polymers

In the context of this disclosure, the hydrophilic membranes for use with the apparatus embodying the invention are made from hydrophilic polymers. "Hydrophilic polymers" mean polymers which absorb water when in contact with liquid water at room temperature according to the International Standards Organization specification ISO 62 (equivalent to the American Society for Testing and Materials specification ASTM D 570).

The hydrophilic polymer can be one or a blend of several polymers, for example, the hydrophilic polymer can be a copolyetherester elastomer or a mixture of two or more copolyetherester elastomers as described below, such as polymers available from E.I. du Pont de Nemours and Company under the trade name Hytrel®; or a polyether-block-polyamide or a mixture of two or more polyether-block-polyamides, such as polymers available from the Elf-Atochem Company of Paris, France under the trade name of PEBAX; or a polyether urethane or a mixture of polyether urethanes; or homopolymers or copolymers of polyvinyl alcohol or a mixture of homopolymers or copolymers of polyvinyl alcohol.

A particularly preferred polymer for water vapor transmission in this invention is a copolyetherester elastomer or mixture of two or more copolyetherester elastomers having a multiplicity of recurring long-chain ester units and short-chain ester units joined head-to-tail through ester linkages, where the long-chain ester units are represented by the formula:

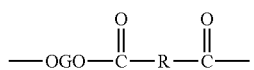
(I)

and said short-chain ester units are represented by the formula:

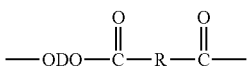
(II)

wherein:

a) G is a divalent radical remaining after the removal of terminal hydroxyl groups from a poly(alkylene oxide)glycol having a number average molecular weight of about 400–4000;

b) R is a divalent radical remaining after removal of carboxyl groups from a dicarboxylic acid having a molecular weight less than 300;

c) D is a divalent radical remaining after removal of hydroxyl groups from a diol having a molecular weight less than about 250; optionally d) the copolyetherester contains 0–68 weight percent based on the total weight of the copolyetherester, ethylene oxide groups incorporated in the long-chain ester units of the copolyetherester; and e) the copolyetherester contains about 25–80 weight percent short-chain ester units.

This preferred polymer is suitable for fabricating into thin but strong membranes, films and coatings. The preferred polymer, copolyetherester elastomer and methods of making it are known in the art, such as are disclosed in U.S. Pat. No. 4,725,481 for a copolyetherester elastomer with a WVTR of 3500 g/m$^2$/24 hr, or U.S. Pat. No. 4,769,273 for a copolyetherester elastomer with a WVTR of 400–2500 g/m$^2$/24 hr. Both are hereby incorporated by reference.

The polymer can be compounded with antioxidant stabilizers, ultraviolet stabilizers, hydrolysis stabilizers, dyes or pigments, fillers, anti-microbial reagents, and the like.

The use of commercially available hydrophilic polymers as membranes is possible in the context of the present invention, although it is more preferable to use copolyetherester elastomers having a WVTR of more than 400 g/m 2/24 h measured on a film of thickness 25 microns using air at 23° C. and 50% relative humidity at a velocity of 3 m/s. Most preferred is the use of membranes made from commercially available copolyetherester elastomers having a WVTR of more than 3500 g/m$^2$/24 h, measured on a film of thickness 25 microns using air at 23° C. and 50% relative humidity at a velocity of 3 m/s.

Method For Making The Hydrophilic Polymer Membranes

The hydrophilic polymers can be manufactured into membranes of any desired thickness by a number of processes. A useful and well-established way to make membranes in the form of films is by melt extrusion of the polymer on a commercial extrusion line. Briefly, this entails heating the polymer to a temperature above the melting point, extruding it through a flat or annular die and then casting a film using a roller system or blowing a film from the melt.

Useful support materials include woven, non-woven or bonded papers, fabrics and screens permeable to water vapor, including those constructed from fibers of organic and inorganic polymers stable to moisture such as polyethylene, polypropylene, fiberglass and the like. The support material both increases strength and protects the membrane. The support material may be disposed on only one side of the hydrophilic polymer membrane or both sides. When disposed on only one side, the support material can be in contact with the source of water or away from it. Typically the support material is disposed on the outside of containers formed by the hydrophilic polymer membrane to best protect the membrane from physical damage and/or degradation by light.

The water purification apparatus of the present invention, employing the hydrophilic polymer membrane, is not limited to any particular form or shape, and can be, by way of illustration, a bag, a film, a pipe, a tube or the like.

Applications of the Invention

Without being bound to any particular theory, it is believed that the purifying effect identified as the principal inventive concept of the hydrophilic membrane, realized either in the form of a coating or an unsupported membrane, when in contact with water that may contain suspended or dissolved impurities and solids, occurs because highly dipolar molecules such as water are preferentially absorbed and transported across the membrane or coating, compared to ions such as sodium and chloride. When, in addition, a humidity gradient exists across the membrane, water is released from the side not in contact with the source water, and can be absorbed by the roots of plants or by an article to be hydrated or rehydrated. Alternatively, the water vapor can be condensed to provide potable water and water for agricultural, horticultural, industrial, and other uses.

Agricultural/Horticultural Applications. When used to provide moisture to a growing medium for growing plants or crops, the membranes control the moisture content, which can be entrained water vapor or adsorbed water, of the growing medium independent of the type of source water passed through the membrane. The gradient of moisture content between the source of water and the growing medium always tends towards equilibrium, so in conditions where the growing medium is dry, there is a relatively rapid rate of water transport across the membrane to provide water to the growing medium. In conditions where the growing medium already has a high moisture content, the gradient across the membrane between the source of water and the growing medium is closer to equilibrium, so the rate of transfer of water across the membrane to the growing medium is lower, and can even be zero if equilibrium is reached.

Due to the nature of the hydrophilic membranes, water is passed over the entire surface of the membrane as determined by the moisture content of the soil, which can be infinitely variable along the surface of the membrane. The rate at which water passes through the membrane and the conditions of equilibrium may be adjusted to specific growing requirements, for example by increasing or reducing the temperature of the source water, by varying the thickness of the membrane or by modifying the polymer composition of one or more of the layers.

The apparatus coated with a layer of the hydrophilic membrane acts in the same way as the apparatus having an unsupported hydrophilic membrane in that both are self-regulating water release systems which provide water to a growing medium as needed, depending on the moisture content of the growing medium.

In the context of this disclosure, a "growing medium" is a medium in which the roots of plants grow. Therefore the term "growing medium" includes naturally occurring or artificially amended soils used in but not limited to agriculture, horticulture and hydroponics. These soils include varying amounts of sand, silt, clay and humus. "Growing medium" also includes but is not limited to other materials used for growing plants, such as vermiculite, perlite, peat moss, shredded tree fern trunks, chipped or shredded tree bark and shredded coconut husks. As the membrane provides moisture in the form of water vapor to the growing medium, growing medium materials having hygroscopic properties more effectively bind and store the water vapor and may perform better with this invention.

For most effectively providing moisture to the growing medium in agricultural and horticultural irrigation, the membrane must be as close as possible to the growing medium. Typically, the membrane is completely covered by the growing medium to maximize contact and protect the polymer from degradation by sunlight. The membrane also needs to be placed sufficiently close to the root zone in the growing medium to provide moisture to the plants.

The membrane can be unsupported or coated on a support material to increase strength and durability. The apparatus typically has at least one opening for filling with water. To provide moisture for an extended period, the apparatus is conveniently in the form of a bag, pipe or tube, allowing the water to be continuously or periodically flushed to prevent the built up of salts or other pollutants. Water vapor preferentially passes through the membranes, leaving behind dissolved salts and other materials as well as suspended particulates such as inorganic or organic matter, including microbes like bacteria, viruses and the like.

Agriculturally related embodiments of this invention include providing moisture for growing plants, germinating seeds while excluding not only injurious salts but also pathogens such as fungi, bacteria and viruses harmful to the seeds and plants. This can be achieved by placing the plant roots or seeds on a layer of the membrane in contact with water on the side opposite to the roots or seed. Alternatively, for seed germination, the seeds can be encased in the hydrophilic membrane, such as in a sealed container, and the container placed in contact with water or a moistened medium. This allows the seeds to germinate in a sterile environment, preventing seed losses due to attacks by pathogens.

Humidification/Horticultural Applications. Besides providing moisture to the seeds, plants, or growing medium in agricultural applications, the apparatus of the present invention can also be used to maintain or raise the humidity of enclosed chambers. An example is in agricultural applications to provide moisture to the air surrounding the plants in growth chambers.

When the plants are grown in an enclosed growth chamber, such as a greenhouse, the increase in humidity can have a significant and beneficial effect. Moreover, the membranes of this invention can be partially or completely exposed to the air space, to raise humidity by the process of pervaporation. The membranes of the water delivery apparatus can be partially or completely in contact with the airspace. To protect the hydrophilic polymer from degradation, the membrane can be covered by a layer of support material to block light or preferably the apparatus is placed under shade or in a darkened enclosure.

As in agricultural applications, the apparatus typically has at least one opening for filling with water, and to provide moisture for an extended period, the apparatus is conveniently in the form of a bag, pipe or tube, allowing the water to be continuously or periodically flushed to prevent the built up of salts or other pollutants.

Hydration or Rehydration. The method of pervaporation through the membrane and the water purification apparatus of the present invention can be used to hydrate or rehydrate materials such as food or pharmaceutical or agricultural compositions. The dry or dehydrated materials can be carried in sealed pouches comprising the hydrophilic membrane of the invention, and then hydrated or rehydrated using water vapor contained in air, or liquid water that may contain suspended or dissolved impurities, including but not limited to seawater, brackish water or other kinds of polluted water.

Desalination. An important feature of this invention is that the membranes selectively discriminate not only against particulates, but also against pollutants that are dissolved in the water, including but not limited to salts, as well as against pollutants that are present in the form of an emulsion in the water, including but not limited to oils, greases, and the like. The membranes can also function to purify a contaminated water vapor gaseous and/or liquid mixtures. This process of selective discrimination occurs at room temperature and even without pressure applied across the membrane. Therefore, the invention allows water vapor contained in air, or liquid water containing a level of residual salts that is low enough for direct use in agriculture, starting from seawater, brackish water or other sources of polluted water to be used, using apparatus that can be operated at a much lower cost than conventional desalination systems such as seawater reverse osmosis, brackish water reverse osmosis, electrodialysis reversal, multiple effect distillation, multiple stage flash and mechanical vapor compression systems.

In summary, pervaporation though the water purification apparatus of the present invention thus can be used to purify water to irrigate agricultural land, to provide a self-regulating watering means for a growing medium, to humidify the air spaces of growth chambers such as greenhouses, to provide potable water and to hydrate or rehydrate dried foods, pharmaceuticals and the like.

The present invention can be operated at a lower cost and with less equipment infrastructure, compared to the prior art systems. Because the apparatus for providing moisture to a growing medium or the air space of an enclosed chamber emits water in the form of water vapor instead of liquid water, the pressure of impure water supplied to the membrane layer of the apparatus can be much less than the 2500 kPa typically required for purification of seawater using reverse osmosis. The pressure is even less than the lower pressures required for reverse osmosis of less saline brines. Generally, the applied pressure differential over ambient atmospheric pressure is less than about 1000 kPa. Although high pressures may increase the rate at which the membrane layer emits water vapor, excessive pressure can shift the self-regulating equilibrium to cause the growing medium to become too wet. Furthermore, high pressures require thick membranes or preferably strong supporting materials to contain the pressure.

Therefore, the applied pressure is typically less than about 250 kPa, and very often less than about 100 kPa. Most often the applied pressure is little or no more than that provided by the weight of the water itself, or the pressure needed to flush impure water through the water purification apparatus, as this allows the use of thin hydrophilic membranes or films of the hydrophilic polymer.

EXAMPLES

In the examples that follow, Copolyetherester A is a polymer made according to the method disclosed in U.S. Pat. No. 4,725,481 starting from 30 parts of dimethyl terephthalate, 57 parts of a poly(alkylene)glycol the alkylene content of which comprises of 65% ethylene and 35% propylene, 9 parts of dimethyl isophthalate, 16 parts of butanediol (stoichiometric amount) and 0.7 parts of trimethyl trimellitate. Copolyetherester A contains about 37% by weight of poly(ethylene oxide)glycol, and the membranes made from Copolyetherester A feature a water swell of around 54% by weight at room temperature and a WVTR of at least 10,000 $g/m^2 124$ h, measured on a film of thickness 25 microns using air at 23° C. and 50% relative humidity at a velocity of 3 m/s.

Copolyetherester B is a polymer made according to the method disclosed in U.S. Pat. No. 4,725,481 starting from 44 parts of dimethyl terephthalate, 51 parts of a poly (alkylene)glycol the alkylene content of which comprises of 65% ethylene and 35% propylene, 19 parts of butanediol (stoichiometric amount) and 0.4 parts of trimethyl trimellitate. Copolyetherester B contains about 33% by weight of poly(ethylene oxide) glycol, and the membranes made from Copolyetherester B feature a water swell of around 30% by weight at room temperature and a WVTR of at least 10,000 $g/m^2/24$ h, measured on a film of thickness 25 microns using air at 23° C. and 50% relative humidity at a velocity of 3 m/s.

Copolyetherester C is a polymer made according to the method disclosed in U.S. Pat. No. 4,725,481 starting from 50 parts of dimethyl terephthalate, 44 parts of a poly (alkylene)glycol the alkylene content of which comprises of 85% propylene and 15% ethylene, 21 parts of butanediol (stoichiometric amount) and 0.3 parts of trimethyl trimellitate. The membranes made from Copolyetherester C feature a water swell of around 5% by weight at room temperature and a WVTR of 2,200 $g/m^2/24$ h, measured on a film of thickness 25 microns using air at 23° C. and 50% relative humidity at a velocity of 3 m/s.

Examples 1–10

The first set of examples, Examples 1–10, demonstrates that water vapor passes through the hydrophilic membranes of the water purification apparatus, and that the hydrophilic membranes let water pass through them but reject the passage of salt ions. In the examples, five hydrophilic membrane bags made from an extruded film of the hydrophilic polymer Copolyetherester A were filled with seawater, and five hydrophilic membrane bags were made from an extruded film of another hydrophilic polymer Copolyetherester B were filled with tap water. A heat sealer was used to seal the hydrophilic membrane bags closed. The bags had a maximum effective surface area calculated as 0.1 $m^2$.

The bags were placed in a room at ambient temperature and uncontrolled humidity. Samples 2, 3, 5, 7, 8 and 9 were placed directly on the metal tray. Samples 1 and 10 were laid on tissue paper on the tray and samples 4 and 6 were placed on nylon mesh to indicate possible effects of air flow or 'wicking', which would affect the rate at which water vapor was removed from the surface. As soon as the bags were filled, the surface of the bags became damp to the touch. The bags were completely sealed and the upper surface of each bag was exposed to air.

The bags were weighed and visually inspected every day over a period of one week, and the measured weight decreased daily until at between five and seven days all the bags were empty of water. In this first case, as the test was an empirical indicator, it was difficult to take into account all the factors such as original mass of water, type of water, surface area, water contact area and thickness of film. However, taking all these considerations into account, there was no apparent difference in the rate of 'water loss' for a similar surface area.

The now empty bags which had originally contained seawater were found to have a white salty deposit inside, visible as large crystals. The bag in Example 5, for instance, contained in excess of 20 g of solids. Under ambient pressure and temperature, in excess of 2 liters of water per square meter per day pervaporated through the bags. Other measurements suggested that Copolyetherester A was capable of passing more than one liter of water per square meter per hour, given a sufficiently fast flow of air across the surface of the hydrophilic membrane to remove the water vapor as it was emitted from the bag by pervaporation. It is believed that natural evaporation rate of the water was the limiting factor in the flow of water through the bag. Hydrophilic membrane bag samples 1 and 10, which were placed on paper tissue, and hydrophilic membrane bag samples 4 and 6, which were placed on nylon mesh, did not release water any faster than hydrophilic membrane bags that had been placed directly on a metal tray. There was also no noticeable difference between the thicker and thinner films of polymer.

The results of the examples are summarized in Table 1 below.

TABLE 1

Pervaporation of Water through Sealed Hydrophilic Membrane Bags

| Example | Polymer type | Membrane thickness (microns) | Water source | Starting mass (g) |
|---|---|---|---|---|
| 1 | Copolyetherester B | 100 | Sea | 493 |
| 2 | Copolyetherester B | 100 | Sea | 418 |
| 3 | Copolyetherester B | 100 | Tap | 488 |
| 4 | Copolyetherester A | 100 | Sea | 509 |
| 5 | Copolyetherester A | 100 | Sea | 551 |
| 6 | Copolyetherester A | 100 | Tap | 441 |
| 7 | Copolyetherester A | 50 | Sea | 260 |
| 8 | Copolyetherester A | 50 | Tap | 515 |
| 9 | Copolyetherester B | 50 | Tap | 338 |
| 10 | Copolyetherester B | 50 | Tap | 380 |

Examples 11–14

Figure 2:
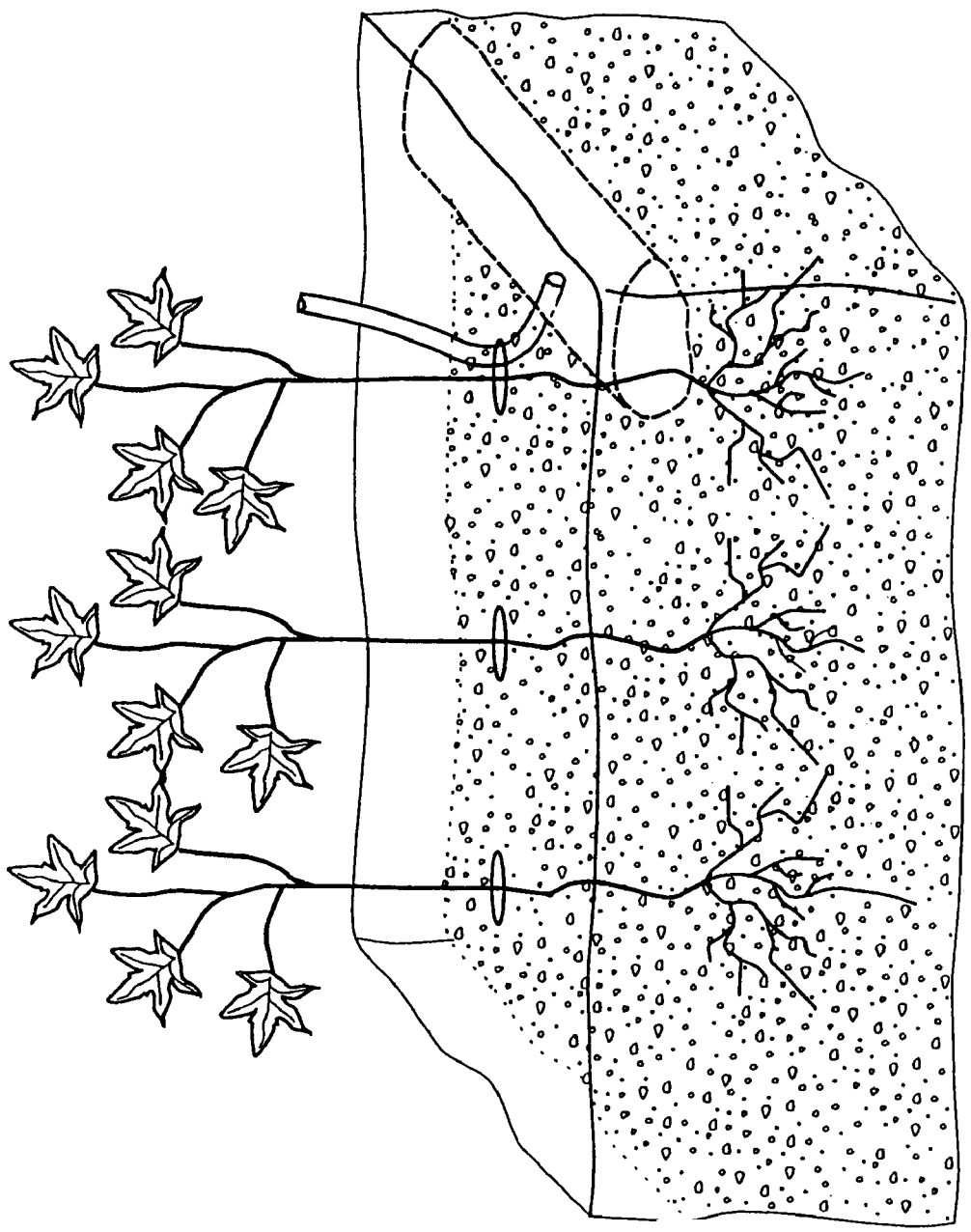

In the next set of examples, Examples 11–14, the viability of using hydrophilic membranes made from the hydrophilic polymer in a desalination apparatus was validated. Examples 11 and 14, 12 and 13 are illustrated in FIGS. 1 and 2 respectively.

In these examples, growing containers called "growbags" were used. "Grow-bags" are commercially available, sealed polyethylene bags of approximate dimensions 100× 50×15 cm, containing a moist soil mixture suitable for growing plants such as tomatoes outdoors. When using "grow-bags," it is standard practice to place them on the ground with their largest face horizontal, so that they act like miniature plant beds of area 100×50 cm and height 15 cm. Three small slits were cut into the top and three tomato seedlings were planted into the soil of the "grow-bag," with their shoots and leaves protruding from the top of the bag. The polyethylene material of the "grow-bag" served to retain the soil around the plant roots, as well as preventing excessive evaporation of moisture. Tomato plants were chosen because they have a short but active growing season and have a substantial leaf area that would serve as a convenient indicator of plant health.

All twelve tomato plants were watered with clean well water for two weeks to confirm that they were all healthy and to allow them to become established in the "grow-bags". The environment was an open greenhouse that was covered, but unheated, and fully ventilated to represent outdoor growth without rainfall. During the experiments, all plants were allowed to grow completely naturally without pruning or training and without additional assistance. Each "grow-bag" containing three plants each was watered by a different method as follows:

Example 11

Clean well water, administered through a perforated static hose with a row of holes to ensure even watering.

Example 12

Clean well water, administered into a tubular hydrophilic membrane irrigation bag of diameter 20 cm and length 40 cm approximately, made from a film of Copolyetherester A. The irrigation bag was then placed within the "grow-bag" along one edge of length 50 cm in the space between the top of the soil and the polyethylene material of the "grow-bag".

Example 13

Seawater, administered into a tubular hydrophilic membrane irrigation bag of diameter 20 cm and length 40 cm approximately, made from a film of Copolyetherester A. As in Example 13, the irrigation bag was placed within the "grow-bag" along one edge of length 50 cm in the space between the top of the soil and the polyethylene material of the "grow-bag".

Example 14

Seawater, administered through a perforated static hose as per Example 11.

The surface area of the hydrophilic membrane irrigation bags was estimated at 0.25 m². This surface area provided the moisture supporting the growth of the three tomato plants in Examples 12 and 13.

On Day 1, the watering began using the above system. All of the plants were green, healthy and indistinguishable in advantage. The plants in Example 11 were watered daily, sufficient to keep the plants looking healthy. The plants in Example 14 received the same measured amount of water as in Example 11. The reservoirs which filled the membrane irrigation bags made from copolyetherester elastomer were kept topped up at daily intervals, so the irrigation bags were always full, Example 12 with clean well water and Example 13 with seawater.

By Day 4, all the plants in Example 14 which had been watered daily with seawater showed yellow spotting of the stems and leaves. There was no discernible difference between Examples 11 and 12 with well water, and Example 13 with seawater. All plants in Examples 11, 12 and 13 were healthy.

On Day 21, the plants in Example 14 were yellow in color and looked flaccid. The plants in Examples 11, 12 and 13 had no visible blemishes or defects.

As the plants matured through Day 60, fruit was produced on the plants in Examples 11, 12 and 13. The plants had a regular shape and good and even color. The plants in Example 14 were dying and produced a very few small, poorly shaped fruit. The plants in Examples 11, 12 and 13 went on to bear good fruit, including Example 13 which was watered with seawater through the membrane of the present invention made from copolyetherester elastomer. No difference was discernible between the quantity or the quality of fruit on the plants in Examples 11, 12 or 13. The fruit in Example 14 showed brown and yellow blemishes, in sharp contrast to the fruit on the other plants.

Significantly, the amount of water required to 'top up' the hydrophilic membrane irrigation bags made from copolyetherester elastomer in Examples 12 and 13 varied depending on the weather. On a hot day, the hydrophilic membrane irrigation bags made from copolyetherester elastomer required an additional half liter of water, on cool damp days, the irrigation bags needed very little topping up. This showed that the pervaporation of water through the membrane was self-regulating, and was dependent on the moisture content and temperature of the air and soil in contact with the hydrophilic membrane. In Examples 12 and 13, the membrane bags made from copolyetherester elastomer provided moisture to the plants through the soil and also humidified the air in the vicinity of the plants.

It is believed there was a buildup in contamination and salinity in the membrane irrigation bag made from copolyetherester elastomer which 'watered' the plants of Example 13, because only water (with an amount of dissolved salts that was not measured, but that was clearly not at a level that was harmful to the plant) was able to pervaporate through the hydrophilic membrane, leaving a continuously increasing concentration of salts in the seawater remaining in the hydrophilic membrane irrigation bag. This suggests that the hydrophilic membrane irrigation bags made from copolyetherester elastomer can sustain plant growth for even longer periods than the experimental "season" used in Experiments 11–14, if any saline water that was used were flushed intermittently or circulated continuously from a larger source, so limiting the buildup of salts in the source water.

On cutting open the "grow-bags" after the experiments of Examples 11–14 had been concluded, the contents of the "grow-bag" of Example 14, which was watered directly with seawater, were still wet to the touch. This was also evident by the dark color of the growing medium, which was indicative of the high salt content of the soil after watering directly with seawater. The contents of the other "grow-bags" in Examples 11–13 were all dry to the touch and light in color, including the soil in the "grow-bag" of Example 13 that had been watered with seawater through the hydrophilic copolyetherester elastomer membrane.

Examples 15–19

Further experiments were carried out to explore the potential of growing a number of plants irrigated through the membranes of the present invention under severe conditions of water availability to the plants concerned. The results clearly demonstrate the viability of a self-regulating hydrophilic vapor-permeable membrane in accordance with one of the embodiments of the present invention, even though very severe growing conditions were employed.

Figure 3:
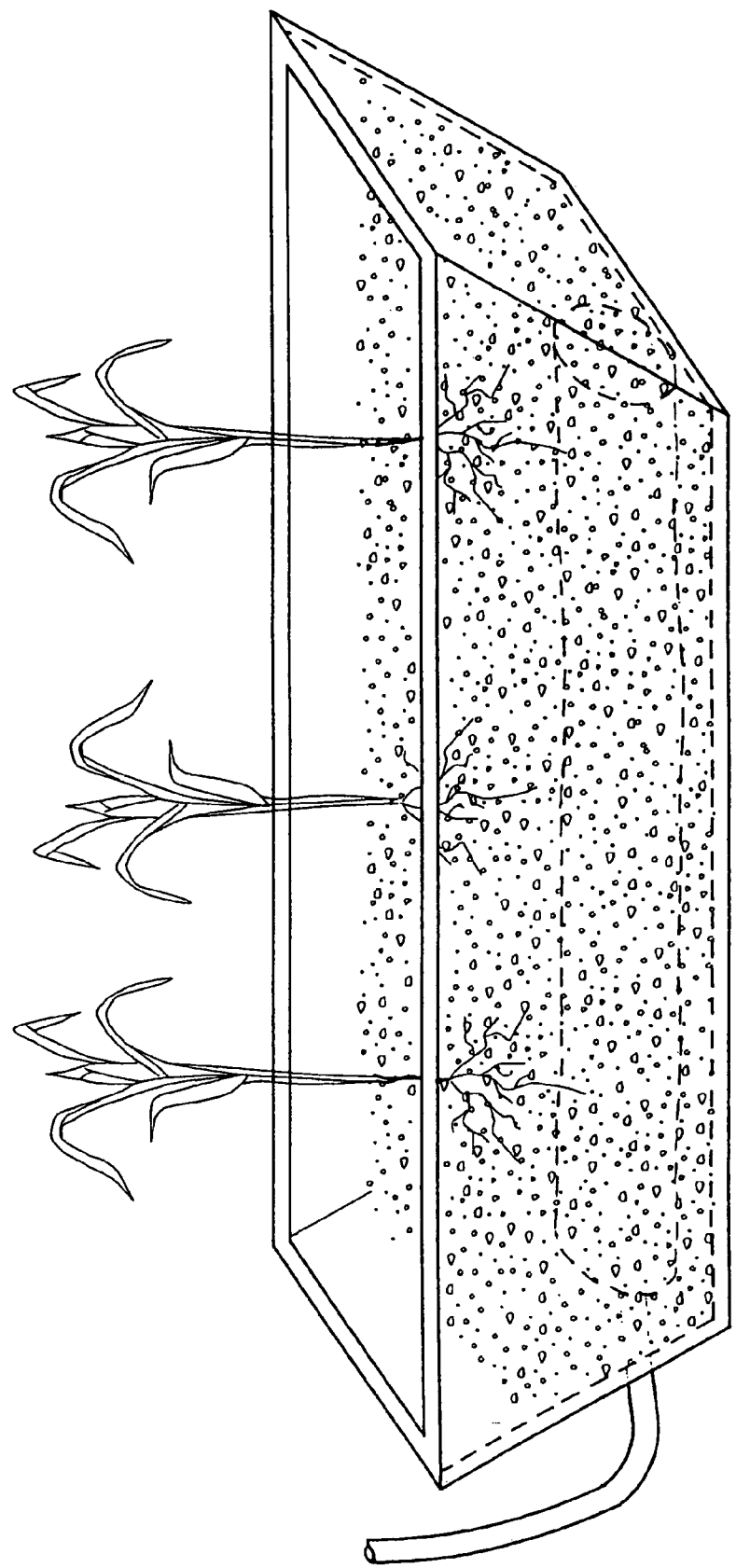
FIG. 3 is an explanatory drawing of plants growing in the representative open containers in Experiments 10 and 12 of Example 17.
Figure 4:
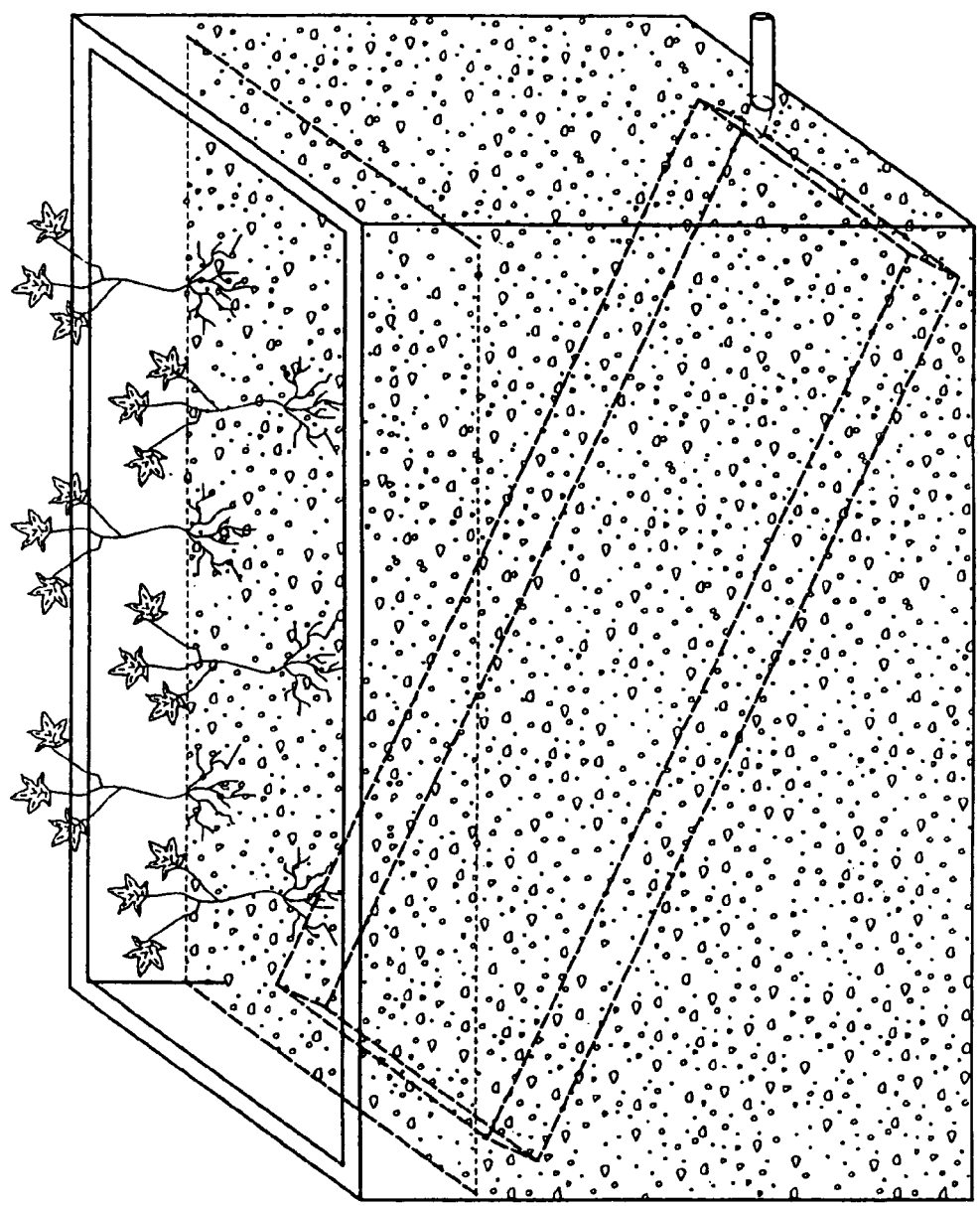
FIG. 4 is an explanatory drawing of plants growing in the representative open container in Experiment 17 of Example 19.

The plants that were grown included tomatoes, radishes, maize and sorghum. In these experiments, growing containers made of polypropylene plastic, terra-cotta and plywood of different sizes and porosity were used. Representative experiments are illustrated in FIGS. 3 and 4. The topsoil used in Examples 15–19 was dried to a maximum of 15% moisture by weight, and the sand used was totally dry.

Porous growing containers made from terra-cotta or plywood were used in most experiments, with growing containers made from polypropylene plastic being used as references. The porous growing containers served to allow water vapor to escape through the walls of the growing container to simulate the lateral loss of water typically found in a field. In all experiments, except in Experiment 15 of Example 18, the tops of the growing containers were open to the atmosphere, so that water vapor could escape from the top of the soil. The plants experienced temperatures of around 30° C. in the greenhouse environment for most of their growing period of around 80 days.

These severe conditions were in contrast to the milder conditions under which the experiments disclosed in Examples 11–14 were performed. In Examples 11–14, the "grow bag" containers contained moist topsoil and the containers were sealed polyethylene bags. The polyethylene materials of which the "grow-bags" were made prevented the loss of water vapor through the walls of these growing containers, as opposed to the more porous containers made out of plywood and terra-cotta that were used in Examples 15–19.

Unless noted otherwise, the hydrophilic membrane irrigation bags used in Examples 15–19 were watertight flat horizontal bags, prepared from 50-micron thick films of Copolyetherester B. All hydrophilic membrane irrigation bags were provided with a flexible tube sealed into the side, in a way that the bags could be topped up from a reservoir outside of the growing container. The hydrophilic membrane irrigation bags were buried in dry fertilized sand or in dried fertilized topsoil (maximum moisture content 15% by weight) to a depth of around 10 cm, unless noted otherwise. In different experiments, the hydrophilic membrane irrigation bags variously contained de-ionized water, brackish water or seawater. In all cases, the hydrophilic membrane irrigation bags were kept topped up with de-ionized water from an outside reservoir through the flexible tube.

Plants were either germinated in situ within the growing container with a small amount of water; or else they were transplanted into the growing containers as seedlings. The experiments were carried out under greenhouse conditions. At the end of the tests, the plants were removed from the growing containers, cleaned of growing medium and dried. The dry shoots, roots and fruit were weighed separately.

The growing experiments in Examples 15–19 were discontinued after around 80 days. The rate of water transfer through the hydrophilic polymer membranes of each experiment was determined, by measuring the daily amount of water needed to top up each reservoir.

Once the plants had reached maturity and the rate of water loss by pervaporation through the hydrophilic membrane irrigation bag had stabilized, the average water transfer rate per unit area of hydrophilic polymer membrane was calculated.

Example 15

In this example, corn (maize) plants were grown in dry fertilized sand or topsoil in four growing containers identified as Experiments 1, 2, 3 and 4, with hydrophilic membrane irrigation bags made from Copolyetherester B buried under the soil to a depth of around 10 cm. The containers were made of terra-cotta (Experiments 1 and 3) or polypropylene plastic (Experiments 2 and 4). The hydrophilic membrane irrigation bag extended about halfway along the bottom of each growing container. Three plants were grown in each container, such that Plant A was located directly above the hydrophilic membrane irrigation bag, Plant B was located over the edge of the irrigation bag and Plant C was located away from the irrigation bag at the other end of the growing container. The results are shown in Table 2.

TABLE 2

Shoot and Root Dry Weights of Corn Plants and Average Water Transfer Rate through Hydrophilic Membrane Irrigation Bag

| | A | | B | | C | | Average Water Transfer Rate |
| --- | --- | --- | --- | --- | --- | --- | --- |
| Ex. | Weight of dry shoots (g) | Weight of dry roots (g) | Weight of dry shoots (g) | Weight of dry roots (g) | Weight of dry shoots (g) | Weight of dry roots (g) | through Membrane (g/m²/24 h) |
| 1 | 5.45 | 2.86 | 1.42 | 1.85 | 1.13 | 1.60 | 750 |
| 2 | 4.68 | 2.38 | 2.90 | 2.00 | 3.26 | 3.28 | 450 |
| 3 | 0.44 | 1.60 | 0.26 | 0.66 | 0.25 | 0.50 | 200 |
| 4 | 1.84 | 1.01 | 4.26 | 3.30 | 0.59 | 0.54 | 200 |

The shoot and root weights illustrate the better retention of moisture by the polypropylene plastic containers (Experiments 2 and 4), compared to the more porous terra-cotta containers (Experiments 1 and 3). Plants grown on topsoil (Experiments 1 and 2) grew better than plants grown on sand (Experiments 3 and 4).

Plant A, which was located closest to the hydrophilic membrane irrigation bag and therefore closest to the water source, grew to a much greater extent than Plant C, as it was the most distant from the irrigation bag. This illustrates that water pervaporating through the hydrophilic membrane irrigation bag sustained plant growth.

Example 16

In four growing containers, identified as Experiments 5, 6, 7 and 8, previously germinated sorghum seedlings of height around 7–10 cm were transplanted and grown in dry fertilized sand or topsoil, with hydrophilic membrane irrigation bags made from Copolyetherester B buried under the soil to a depth of around 10 cm, in terra-cotta (Experiments 5 and 7) or polypropylene plastic (Experiments 6 and 8) containers. The irrigation bag extended about halfway along the bottom of each growing container.

Three plants were grown in each container, such that Plant A was located directly above the irrigation bag, Plant B was located over the edge of the hydrophilic membrane irrigation bag and Plant C was located away from the irrigation bag at the other end of the growing container.

As in Example 15 above, the shoot and root weights and Average Water Transfer Rates in Table 3 clearly illustrate that sorghum plants grown in topsoil (Experiments 5 and 6)

grew better than plants grown in sand (Experiments 7 and 8). Plant A grew to the greatest extent and Plant C to the least, reflecting their proximity to the hydrophilic membrane irrigation bag water source.

TABLE 3

Shoot and Root Dry Weights of Sorghum Plants and Average Water Transfer Rate through Hydrophilic Membrane Irrigation Bag

| | A | | B | | C | | Average Water Transfer Rate |
| --- | --- | --- | --- | --- | --- | --- | --- |
| Ex. | Weight of dry shoots (g) | Weight of dry roots (g) | Weight of dry shoots (g) | Weight of dry roots (g) | Weight of dry shoots (g) | Weight of dry roots (g) | through Membrane (g/ $m^2$/24 h) |
| 5 | 4.71 | 5.85 | 4.33 | 0.70 | 0.75 | 0.23 | 1130 |
| 6 | 4.30 | 5.40 | 3.74 | 1.18 | 2.88 | 0.65 | 1130 |
| 7 | 0.25 | 0.18 | 0.28 | 0.26 | 0.07 | 0.10 | 200 |
| 8 | 0.53 | 0.43 | 0.16 | 0.13 | 0.09 | 0.08 | 200 |

Example 17

In four growing containers, identified as Experiments 9, 10, 11 and 12, previously germinated corn (maize) seedlings of height around 7–10 cm were transplanted and grown in dried fertilized topsoil, with hydrophilic membrane irrigation bags buried under the soil to a depth of around 10 cm in terra-cotta containers. Two different materials were used for the hydrophilic membrane irrigation bags—Copolyetherester A for Experiment 11 and Copolyetherester B for Experiments 9, 10 and 12. Copolyetherester A absorbs more than 50% of water by volume, compared to 30% absorbed by Copolyetherester B. Therefore, Copolyetherester A features higher water vapor permeability than Copolyetherester B.

The hydrophilic membrane irrigation bags extended about halfway along the bottom of the growing containers used in Experiments 9 and 11, but extended along the entire bottom of the growing containers used in Experiments 10 and 12. Three plants were grown in each container, such that Plant A was located directly above the irrigation bag, Plant B was located over the edge of the hydrophilic membrane irrigation bag and Plant C was located away from the irrigation bag at the other end of the growing container in Experiments 9 and 11. All plants were located directly above the hydrophilic membrane irrigation bags used in Experiments 10 and 12.

Compared to Experiment 9, the effect of increasing the surface area of the hydrophilic membrane irrigation bag is illustrated by Experiment 10, and the effect of using a material with higher water vapor permeability is illustrated by Experiment 11. Finally, Experiment 12 demonstrates the effect of using seawater rather than freshwater, within the hydrophilic membrane irrigation bag of larger surface area, as used in Experiment 10.

The shoot and root weights and the Average Water Transfer Rates to the corn plants in these experiments are shown in Table 4. The data illustrate that the greatest improvement in growing conditions was achieved by using a hydrophilic membrane irrigation bag of greater surface area (Experiment 10). Using the more permeable Copolyetherester A for the irrigation bag (Experiment 11) instead of the standard Copolyetherester B (Experiment 9) also led to greater plant growth. Experiment 12 illustrates that corn plants could be successfully grown even when irrigated through a bag containing seawater.

TABLE 4

Shoot and Root Dry Weights of Corn Plants and Average Water Transfer Rate through Hydrophilic Membrane Irrigation Bag

| | A | | B | | C | | Average Water Transfer Rate |
| --- | --- | --- | --- | --- | --- | --- | --- |
| Ex. | Weight of dry shoots (g) | Weight of dry roots (g) | Weight of dry shoots (g) | Weight of dry roots (g) | Weight of dry shoots (g) | Weight of dry roots (g) | through Membrane (g/ $m^2$/24 h) |
| 9 | 2.24 | 0.89 | 1.62 | 0.88 | 0.11 | 0.15 | 380 |
| 10 | 6.68 | 1.47 | 7.64 | 2.76 | 8.25 | 3.47 | 830 |
| 11 | 3.30 | 3.59 | 3.54 | 1.07 | 3.71 | 1.05 | 750 |
| 12 | 1.03 | 0.95 | 1.44 | 1.22 | 1.13 | 0.91 | 170 |

Example 18

In three terra-cotta growing containers, identified as Experiments 13, 14 and 15, previously germinated corn (maize) seedlings of height around 15 cm were grown, using hydrophilic membrane irrigation bags made from Copolyetherester B and buried under the soil to a depth of around 15 cm. In a fourth terra-cotta growing container, identified as Experiment 16, a Celebrity tomato seedling was grown, also using hydrophilic membrane irrigation bags as described for Experiments 13, 14 and 15. The irrigation bags extended along the entire bottom of each growing container. One plant was grown in each container, located directly above the hydrophilic membrane irrigation bag. Compared to the containers described in Examples 15, 16 and 17 (dimensions 15×15×60 cm) above, the containers used for Experiments 13, 14, 15 and 16 were larger (50×50×50 cm). All irrigation bags were the same size and extended along the entire bottom of the growing containers, so that around 1,450 cm$^2$ of membrane surface area were available for the single plants used in these Experiments 13, 14, 15 and 16, compared to an area of 265 cm$^2$ or 600 cm$^2$ available to three plants used in the experiments described in Examples 15, 16 and 17.

In the reference Experiment 13, a corn seedling was grown in dried fertilized topsoil, irrigated through an irrigation bag containing freshwater. In Experiment 14, seawater was used as the water source in the irrigation bag. In Experiment 15, dry fertilized sand was used instead of topsoil as the growing medium for the corn plant, and the growing container was covered with a sheet of black polyethylene plastic to retard water evaporation from the soil surface. A Celebrity tomato plant instead of corn was used in Experiment 16, which was irrigated using seawater as the water source in the hydrophilic membrane irrigation bag, with other factors remaining the same as in the reference Experiment 13. Dried shoot and root weights and Average Water Transfer Rates are shown in Table 5.

TABLE 5

Shoot and Root Dry Weights of Corn and Tomato Plants and Average Water Transfer Rate through Hydrophilic Membrane Irrigation Bag

| Experiment | Plant | Weight of dry shoots (g) | Weight of dry roots (g) | Average Water Transfer Rate through Membrane (g/m²/24 h) |
|---|---|---|---|---|
| 13 | Corn | 18.89 | 6.92 | 280 |
| 14 | Corn | 6.65 | 3.81 | 70 |
| 15 | Corn | 5.67 | 7.45 | 210 |
| 16 | Tomato | 5.25 | 1.85 | 70 |

Example 19

Plywood growing containers (60×60×200 cm) were used in Experiments 17 and 18. Celebrity and Rutgers tomato seedlings were transplanted and grown in dried fertilized topsoil. The Celebrity tomato plants were transplanted as seedlings of height around 20 cm, while the Rutgers tomato plants were transplanted as seedlings of height around 10 cm. These two different types of tomato were used to compare their growing behaviors. Celebrity tomatoes grow to larger plants and are a determinate variety, whereas Rutgers tomatoes grow to a more limited size and are an indeterminate variety.

In Experiment 17, hydrophilic membrane irrigation bags made from Copolyetherester B were buried under the soil to a depth starting at just below the surface at one of the 60 cm-wide ends of each growing container and progressively descending in a straight slope along the 200-cm length to the bottom of the growing container at the other 60 cm-wide end. The locations of Plants A, B and C formed a straight line, such that Plant A was located near the shallow end where the irrigation bag was just below the surface, and Plant C was located near the deep end where the irrigation bag reached the bottom of the growing container. Similarly, the locations of Plants W, X and Y formed a straight line parallel to that formed by Plants A, B and C, such that Plant W was located near the shallow end and Plant Y was located near the deep end of the growing container. Plants W, X and Y were staggered relative to Plants A, B and C in order to achieve the recommended spacing of at least 50 cm between plants.

In Experiment 18, plants were individually watered with de-ionized water from a watering can, without using an irrigation bag. An amount of water sufficient for normal growth of each plant was used in this reference experiment.

The relative shoot and root weights of the plants grown in Experiment 17 demonstrated that Plants A, B and W, relatively close to the irrigation bag, grew better than Plants C, X and Y, further away from this water source.

The data for shoots and roots weights of Experiments 17 and 18 and the Average Water Transfer Rate of Experiment 17 are shown in Table 6

TABLE 6

Shoot and Root Dry Weights of Tomato Plants and Average Water Transfer Rate through Hydrophilic Membrane Irrigation Bag

| | Shoots | Roots | Fruit |
|---|---|---|---|
| Experiment 17 (irrigated with sloping bag) | | | |
| Plant A (Celebrity tomato) | 91.32 | 9.34 | 22.24 |
| Plant B (Celebrity tomato) | 73.80 | 7.66 | 30.51 |
| Plant C (Celebrity tomato) | 12.28 | 3.18 | 3.64 |
| Plant W (Rutgers tomato) | 9.81 | 1.43 | — |
| Plant X (Rutgers tomato) | 2.01 | 0.53 | — |
| Plant Y (Rutgers tomato) | 3.89 | 0.69 | — |
| Average Water Transfer Rate through Hydrophilic Membrane (g/m²/24 h) | | | 600 |
| Experiment 18 (irrigated conventionally) | | | |
| Plant A (Celebrity tomato) | 43.03 | 5.35 | 28.24 |
| Plant B (Celebrity tomato) | 55.22 | 4.44 | 17.91 |
| Plant C (Celebrity tomato) | 72.72 | 7.67 | 12.58 |
| Plant D (Celebrity tomato) | 55.71 | 6.34 | 30.60 |
| Plant W (Rutgers tomato) | 19.60 | 1.85 | — |

Examples 20 and 21

This set of Examples 20 and 21 was to demonstrate the humidification application of the present invention.

In Example 20, a watertight sealed bag containing tap water was made from a film of Copolyetherester B of thickness 50 microns and was placed on the bench-top at room temperature. A paper towel was placed on top of the hydrophilic membrane bag, in contact with the membrane surface, and seeds of radish, lettuce, turnip, Brussels sprouts, spinach, cabbage and viola plants were placed on the paper towel and another paper towel was placed on top of the seeds and the assembly was left in the dark. After five days, seeds from all of the plant species above had germinated, using only moisture pervaporating from within the bag.

In Example 21, using a conventional heat-sealing device, a soybean seed was sealed between two layers of hydrophilic membrane of thickness 50 microns made from Copolyetherester B, giving an airtight square translucent pouch of dimensions 2×2 cm, with air trapped around the seed. The hydrophilic membrane pouch was then floated on tap water in a beaker and left in the dark at room temperature. After two weeks, the soybean was observed to have germinated within the pouch, from water that had pervaporated into the pouch through the hydrophilic membrane.

Example 22

This example was to demonstrate the viability of the present invention in a desalination application.

In this example, two hydrophilic membrane bags made from Copolyetherester A were filled with approximately 0.5 L each of seawater, sealed and left in a warm room with free passage of air around the bags. Prior to the experiment, the weight of each bag was recorded. Within three days, both bags were empty of water, leaving a dry salty deposit. The bags were then weighed again, and the weight of solids was calculated to be in excess of 3.7% by weight based on its original weight. The bags were then washed thoroughly to remove any soluble impurities such as salt on the surface of the membrane. The bags were dried and weighed again. A control sample of water of the same initial weight was also evaporated using conventional techniques and the weight of the deposit was recorded. Both samples yielded between 3.7 and 3.8% by weight of solid, which indicated that in excess of 95% of the solid (dissolved and particulate) content in the water was filtered by the hydrophilic membrane.

Example 23

Example 23 demonstrates a rehydration application. In this Example, dehydrated solids were rehydrated. Two samples each of dried baby milk, sugar (sucrose) or table salt (sodium chloride) were placed in separately sealed hydrophilic membrane pouches made from Copolyetherester A. The pouches were placed under water, one sample each under fresh water and one sample each under seawater. The contents were observed to rehydrate rapidly. The speed of rehydration varied, depending upon the different amounts of hygroscopicity of the powders. The specific benefit of providing dehydrated solids in pouches from the inventive hydrophilic membranes is that the user need not carry potable water, since the food can be rehydrated from impure water sources.

Example 24

Example 24 embodies another application where plants were grown from seed using water pervaporating through a hydrophilic membrane. An open plastic trough of dimensions 60×45×3 cm was placed with the largest area horizontal and filled with freshwater to a depth of 2 cm. A hydrophilic membrane of thickness 25 microns made from Copolyetherester C was placed across the top of the trough such that it floated on the surface of the water, draping over the edges of the trough. Grass seeds from a commercial available garden mixture were distributed onto the top of the hydrophilic membrane and covered with around 3 mm of peat moss that contained crystals of a solid, slow-release fertilizer. The experiment was covered with a clear plastic lid that allowed light into the container.

After one week, the inside of the clear plastic lid had become covered with droplets of condensed water, and some grass seeds had germinated along the edge of the hydrophilic membrane, where this condensation had soaked into the peat moss. A few seeds had also germinated across the middle of the hydrophilic membrane, away from the condensed water. In order to prevent further moisture from condensing on the lid and running into the peat moss, the lid was removed at this time. From this time, the water underneath the hydrophilic membrane was progressively replenished with seawater from the English Channel once every two or three days, replacing the water that had pervaporated through the membrane and into the peat moss.

After two weeks, grass was seen to grow from seed across the entire surface of the hydrophilic membrane. Additional grass seeds were found to germinate in the course of the remainder of the experiment.

The experiment was terminated after 14 weeks. At that time, the grass had formed a very dense root mass. Green, healthy blades of grass in excess of 18 cm long were growing normally. This experiment demonstrates that grass can be grown using water pervaporating through the membrane of the present invention using a brackish water source.

It will be appreciated by the skilled addressee that the term purification is somewhat dependent upon the use to which the purified water is to be put. For example, water to be used for growing plants may be less pure than that required for human consumption. Of course, it will be appreciated that the purification process can be repeated in successive stages to enhance purity, i.e., allowing the pollutant water to pass through one or more thicker layer of hydrophilic membranes (or even through an additional filtration system). Furthermore, purity may refer to different components depending upon the context of use. For example, in water for growing plants generally only the salt content will be relevant, whereas in water for human consumption, the active microbial content will be most relevant, and in water for (re-)hydrating drugs for intravenous injection, the total biological load and the salt content will be highly relevant. Thus, purification should be understood to refer to the process of preparing water of sufficient quality for its intended use. Generally, within the context of the invention, purified water released from the membrane will contain about less 1% (preferably less than 0.1% and lower) dissolved or suspended solids and particulate matters. In relation to dissolved salts, these are generally retained in and on the membrane, with purified vapor released from the membrane having a purity of less than about 1% (and typically lower) in relation to dissolved solids.

What is claimed is:

1. A moisture controlled plant growing medium comprising a growing medium and a hydrophilic membrane comprising at least one layer of a polymer through which a water source comprising water is passed under ambient temperature conditions;
   wherein said hydrophilic membrane is non-porous and allows the water to pass through the membrane and into a growing medium,
   wherein said growing medium has a moisture content and said water is permitted to pass through the hydrophilic membrane at a rate that depends on the moisture content of the growing medium.

2. The growing medium according to claim 1, wherein the at least one layer of a polymer is selected from a copolyetherester elastomer, a polyether-block-polyamide, a polyether urethane, a homopolymer of polyvinyl alcohol, a copolymer of polyvinyl alcohol, and mixtures thereof.

3. The growing medium according to claim 2, wherein the hydrophilic polymer is a copolyetherester elastomer, or a mixture of two or more said copolyetherester elastomers,
   wherein said copolyetherester elastomer comprises a multiplicity of recurring long-chain ester units and a multiplicity of recurring short chain ester units, said long-chain ester units and short-chain ester units being joined head-to-tail by ester linkages, wherein the long-chain ester units have the general formula

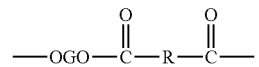

wherein:
   a) G is a divalent radical remaining after terminal hydroxyl groups are removed from a poly(alkylene oxide)glycol having a number average molecular weight of about 400–4000;
   b) R is a divalent radical remaining after carboxyl groups are removed from a dicarboxylic acid having a molecular weight less than 300;
   wherein the short-chain ester units have the general formula

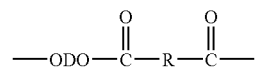

wherein:
a) D is a divalent radical remaining after hydroxyl groups are removed from a diol having a molecular weight less than about 250;
b) R is a divalent radical remaining after carboxyl groups are removed from a dicarboxylic acid having a molecular weight less than 300;
wherein the copolyetherester optionally contains from 0 to 68 wt. % ethylene oxide groups based on the total weight of the copolyetherester, said ethylene oxide groups being contained in the long-chain ester units; and
wherein the copolyetherester contains from about 25 to 80 wt. % of said short-chain ester units.

4. The growing medium according to claim 3, wherein the copolyetherester elastomer having a film thickness of 25 microns has a water vapor transmission rate according to ASTM E96-95 (procedure BW) of at least 400 g/m$^2$/24 hours, said water vapor transmission rate being measured at an air temperature of 23° C., relative humidity of 50% and an air velocity of 3 m/s.

5. The growing medium according to claim 3, wherein the copolyetherester elastomer having a film thickness of 25 microns has a water vapor transmission rate according to ASTM E96-95 (procedure BW) of at least 3500 g/m$^2$/24 hours, said water vapor transmission rate being measured at an air temperature of 23° C., relative humidity of 50% and an air velocity of 3 m/s.

6. The growing medium according to claim 1, wherein said water source further comprises at least one of a suspended solid, a dissolved solid, a pollutant, a salt, and a biological material and said hydrophilic membrane prevents the at least one suspended solid, dissolved solid, pollutant, salt, and biological material from passing through the membrane.

7. The growing medium according to claim 6, wherein the hydrophilic membrane allows the water to pass into the growing medium as a vapor.

8. The growing medium according to claim 1, wherein the moisture content of the growing medium produces a moisture content gradient across the hydrophilic membrane.

9. The growing medium according to claim 8, wherein the moisture content gradient is zero.

10. The growing medium according to claim 1, wherein said growing medium is selected from sand, silt, clay, humus, vermiculite, perlite, peat moss, shredded tree fern trunks, chipped tree bark, shredded tree bark, shredded coconut husks, and mixtures thereof.

11. The growing medium according to claim 1, wherein the hydrophilic membrane is completely covered by said growing medium.

12. The growing medium according to claim 1, wherein said growing medium contains at least one plant seed or plant seedling having a root zone and said hydrophilic membrane is placed adjacent to said root zone.

13. The growing medium according to claim 1, wherein said hydrophilic membrane is selected from a bag, a pipe and a tube.

14. The growing medium according to claim 1, wherein said hydrophilic membrane further comprises at least one opening for filling the membrane with the water.

15. The growing medium according to claim 1, wherein said hydrophilic membrane further comprises support material.

16. The growing medium according to claim 15, wherein said support material is selected from woven paper, non-woven paper, bonded paper, fabric permeable to water vapor, and a screen permeable to water vapor.

17. A process for providing moisture to a growing medium, comprising the steps of:
providing a water delivery apparatus comprising a hydrophilic membrane comprising at least one layer, wherein said hydrophilic membrane is non-porous;
placing the water delivery apparatus contiguous to a growing medium;
introducing a water source comprising water to the water delivery apparatus; and
transmitting the water from the water delivery apparatus through the hydrophilic membrane and into the growing medium, wherein said growing medium has a moisture content and said water is permitted to pass through the hydrophilic membrane at a rate that depends on the moisture content of the growing medium.

18. The process according to claim 17, wherein said water source further comprises at least one of a suspended solid, a dissolved solid, a pollutant, a salt, and a biological material and said hydrophilic membrane prevents the at least one suspended solid, dissolved solid, pollutant, salt, and biological material from passing through the membrane.

19. The process according to claim 18, wherein the hydrophilic membrane allows the water to pass into the growing medium as a vapor.

20. The process according to claim 19, wherein the hydrophilic membrane has a differential transfer rate of vapor across, said hydrophilic membrane of at least 70 g/m$^2$/24 h.

21. The process according to claim 17, wherein the placing step comprises placing the water delivery apparatus within the growing medium.

22. The process according to claim 17, wherein the moisture content of the growing medium produces a moisture content gradient across the hydrophilic membrane.

23. The process according to claim 22, wherein the moisture content gradient is zero.

24. The process according to claim 17, wherein the hydrophilic membrane is completely covered by the growing medium.

25. The process according to claim 17, wherein the water delivery apparatus comprises a bag, a pipe, or a tube.

26. The process according to claim 17 wherein the hydrophilic membrane further comprises a layer of support material.

27. The process according to claim 26, wherein the layer of support material is light blocking and covers the hydrophilic membrane.

28. The process according to claim 26, wherein the support material is selected from woven paper, non-woven paper, bonded paper, fabric permeable to water vapor, and a screen permeable to water vapor.

29. The process according to claim 17, wherein the at least one layer of the hydrophilic membrane is a hydrophilic polymer selected from a copolyetherester elastomer, a polyether-block-polyamide, a polyether urethane, a homopolymer of polyvinyl alcohol, a copolymer of polyvinyl alcohol, and mixtures thereof.

30. The process according to claim 29, wherein the hydrophilic polymer is a copolyetherester elastomer, or a mixture of two or more said copolyetherester elastomers, wherein said copolyetherester elastomer comprises a multiplicity of recurring long-chain ester units and a multiplicity of recurring short chain ester units, said long-chain ester units and short-chain ester units being joined head-to-tail by ester linkages, wherein the long-chain ester units have the general formula

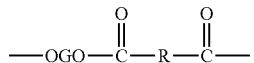

wherein:
a) G is a divalent radical remaining after terminal hydroxyl groups are removed from a poly(alkylene oxide)glycol having a number average molecular weight of about 400–4000;
b) R is a divalent radical remaining after carboxyl groups are removed from a dicarboxylic acid having a molecular weight less than 300;
wherein the short-chain ester units have the general formula

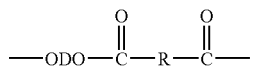

wherein:
a) D is a divalent radical remaining after hydroxyl groups are removed from a diol having a molecular weight less than about 250;
b) R is a divalent radical remaining after carboxyl groups are removed from a dicarboxylic acid having a molecular weight less than 300;
wherein the copolyetherester optionally contains from 0 to 68 wt. % ethylene oxide groups based on the total weight of the copolyetherester, said ethylene oxide groups being contained in the long-chain ester units; and
wherein the copolyetherester contains from about 25 to 80 wt. % of said short-chain ester units.

31. The process according to claim 30, wherein the copolyetherester elastomer having a film thickness of 25 microns has a water vapor transmission rate according to ASTM E96-95 (procedure BW) of at least 400 g/m²/24 hours, said water vapor transmission rate being measured at an air temperature of 23° C., relative humidity of 50% and an air velocity of 3 m/s.

32. The process according to claim 30, wherein the copolyetherester elastomer having a film thickness of 25 microns has a water vapor transmission rate according to ASTM E96-95 (procedure BW) of at least 3500 g/m²/24 hours, said water vapor transmission rate being measured at an air temperature of 23° C., relative humidity of 50% and an air velocity of 3 m/s.

33. The process according to claim 17, wherein said growing medium is selected from sand, silt, clay, humus, vermiculite, perlite, peat moss, shredded tree fern trunks, chipped tree bark, shredded tree bark, shredded coconut husks, and mixtures thereof.

34. A process for germinating plant seeds and growing a seedling from such a germinated plant seed, comprising:
providing a water delivery apparatus comprising a hydrophilic membrane comprising at least one layer, wherein said hydrophilic membrane is non-porous, introducing a water source comprising water to the water delivery apparatus, providing a growing medium containing at least one plant seed or plant seedling; and
transmitting the water from the water delivery apparatus through the hydrophilic membrane and into the growing medium, wherein said growing medium has a moisture content and said water is permitted to pass through the hydrophilic membrane at a rate that depends on the moisture content of the growing medium.

35. The process according to claim 34, wherein the hydrophilic membrane is a hydrophilic polymer selected from a copolyetherester elastomer, a polyether-block-polyamide, a polyether urethane, a homopolymer of polyvinyl alcohol, a copolymer of polyvinyl alcohol, and mixtures thereof.

36. The process according to claim 35, wherein the hydrophilic polymer is a copolyetherester elastomer, or a mixture of two or more said copolyetherester elastomers,
wherein said copolyetherester elastomer comprises a multiplicity of recurring long-chain ester units and a multiplicity of recurring short chain ester units, said long-chain ester units and short-chain ester units being joined head-to-tail by ester linkages, wherein the long-chain ester units have the general formula

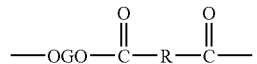

wherein:
a) G is a divalent radical remaining after terminal hydroxyl groups are removed from a poly(alkylene oxide)glycol having a number average molecular weight of about 400–4000;
b) R is a divalent radical remaining after carboxyl groups are removed from a dicarboxylic acid having a molecular weight less than 300;
wherein the short-chain ester units have the general formula

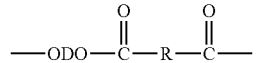

wherein:
a) D is a divalent radical remaining after hydroxyl groups are removed from a diol having a molecular weight less than about 250:
b) R is a divalent radical remaining after carboxyl groups are removed from a dicarboxylic acid having a molecular weight less than 300;
wherein the copolyetherester optionally contains from 0 to 68 wt. % ethylene oxide groups based on the total weight of the copolyetherester, said ethylene oxide groups being contained in the long-chain ester units; and
wherein the copolyetherester contains from about 25 to 80 wt. % of said short-chain ester units.

37. The process according to claim 36, wherein the copolyetherester elastomer having a film thickness of 25 microns has a water vapor transmission rate according to ASTM E96-95 (procedure BW) of at least 400 g/m²/24 hours, said water vapor transmission rate being measured at an air temperature of 23° C., relative humidity of 50% and an air velocity of 3 m/s.

38. The process according to claim 36, wherein the copolyetherester elastomer having a film thickness of 25 microns has a water vapor transmission rate according to ASTM E96-95 (procedure BW) of at least 3500 g/m²/24 hours, said water vapor transmission rate being measured at an air temperature of 23° C., relative humidity of 50% and an air velocity of 3 m/s.

39. The process according to claim 34, wherein said water source further comprises at least one of a suspended solid, a dissolved solid, a pollutant, a salt, and a biological material and said hydrophilic membrane prevents the at least one suspended solid, dissolved solid, pollutant, salt, and biological material from passing through the membrane.

40. The process according to claim 39, wherein the hydrophilic membrane allows the water to pass into the growing medium as a vapor.

41. The process according to claim 40, wherein said hydrophilic membrane has a differential transfer rate of vapor across said hydrophilic membrane of at least 70 g/m²/24 h.

42. The process according to claim 34, wherein the moisture content of the growing medium produces a moisture content gradient across the hydrophilic membrane.

43. The process according to claim 42, wherein the moisture content gradient is zero.

44. The process according to claim 34, wherein said growing medium is selected from sand, silt, clay, humus, vermiculite, perlite, peat moss, shredded tree fern trunks, chipped tree bark, shredded tree bark, shredded coconut husks, and mixtures thereof.

45. The process according to claim 34, wherein the hydrophilic membrane is completely covered by the growing medium.

46. The process according to claim 34, wherein said plant seed and said plant seedling have a root zone and said hydrophilic membrane is placed adjacent to said root zone.

47. The process according to claim 34, wherein said water delivery apparatus comprises a bag, a pipe or a tube.

48. The process according to claim 34, wherein said water delivery apparatus further comprises at least one opening for filling the apparatus with the water source.

49. The process according to claim 34, wherein the hydrophilic membrane further comprises a support material.

50. The process according to claim 49 wherein the support material is selected from woven paper, non-woven paper, bonded paper, fabric permeable to water vapor, and a screen permeable to water vapor.

51. A process for germinating plant seeds and growing a seedling from such a germinated plant seed, comprising:
providing a water source comprising water and at least one of a suspended solid, a dissolved solid, a pollutant, a salt and a biological material;
providing at least one plant seed or plant seedling, said plant seedling having roots,
providing a hydrophilic membrane comprising at least one layer, said hydrophilic membrane having a first surface and a second surface;
placing at least one plant seed, the roots of the plant seedling, or mixtures thereof in contact with the first surface of said hydrophilic membrane;
placing the water source in contact with the second surface of said hydrophilic membrane, wherein said hydrophilic membrane allows the water to pass from the second surface through the hydrophilic membrane to the first surface as water vapor, said hydrophilic membrane preventing the at least one suspended solid, dissolved solid, pollutant, salt, and biological material from passing through the hydrophilic membrane, wherein said hydrophilic membrane has a differential transfer rate of water vapor across said hydrophilic membrane of at least 70 g/m²/24 h.

52. The process according to claim 51, wherein the hydrophilic membrane is a hydrophilic polymer selected from a copolyetherester elastomer, a polyether-block-polyamide, a polyether urethane, a homopolymer of polyvinyl alcohol, a copolymer of polyvinyl alcohol, and mixtures thereof.

53. The process according to claim 52, wherein the hydrophilic polymer is a copolyetherester elastomer, or a mixture of two or more said copolyetherester elastomers, wherein said copolyetherester elastomer comprises a multiplicity of recurring long-chain ester units and a multiplicity of recurring short-chain ester units, said long-chain ester units and short-chain ester units being joined head-to-tail by ester linkages, wherein the long-chain ester units have the general formula

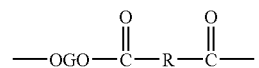

wherein:
a) G is a divalent radical remaining after terminal hydroxyl groups are removed from a poly(alkylene oxide)glycol having a number average molecular weight of about 400–4000;
b) R is a divalent radical remaining after carboxyl groups are removed from a dicarboxylic acid having a molecular weight less than 300;
wherein the short-chain ester units have the general formula

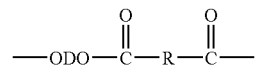

wherein:
a) D is a divalent radical remaining after hydroxyl groups are removed from a diol having a molecular weight less than about 250:
b) R is a divalent radical remaining after carboxyl groups are removed from a dicarboxylic acid having a molecular weight less than 300;
wherein the copolyetherester optionally contains from 0 to 68 wt. % ethylene oxide groups based on the total weight of the copolyetherester, said ethylene oxide groups being contained in the long-chain ester units; and
wherein the copolyetherester contains from about 25 to 80 wt. % of said short-chain ester units.

54. The process according to claim 53, wherein the copolyetherester elastomer having a film thickness of 25 microns has a water vapor transmission rate according to ASTM E96-95 (procedure BW) of at least 400 g/m²/24 hours, said water vapor transmission rate being measured at an air temperature of 23° C., relative humidity of 50% and an air velocity of 3 m/s.

55. The process according to claim 53, wherein the copolyetherester elastomer having a film thickness of 25 microns has a water vapor transmission rate according to ASTM E96-95 (procedure BW) of at least 3500 g/m²/24 hours, said water vapor transmission rate being measured at an air temperature of 23° C., relative humidity of 50% and an air velocity of 3 m/s.

56. A process for germinating plant seeds, comprising:
providing a water source containing water and at least one of a suspended solid, a dissolved solid, a pollutant, a salt and a biological material:
providing at least one plant seed;
providing a hydrophilic membrane comprising one or more layers, wherein said at least one plant seed is encased in the hydrophilic membrane;
introducing the hydrophilic membrane to the water source, wherein said hydrophilic membrane prevents the at least one suspended solid, dissolved solid, pollutant, salt, and biological material from passing through the hydrophilic membrane, said water being permitted to pass through the hydrophilic membrane as water vapor, wherein said hydrophilic membrane has a differential transfer rate of water vapor across the hydrophilic membrane of at least 70 g/m$^2$/24 h.

57. The process according to claim 56, wherein the hydrophilic membrane is a hydrophilic polymer selected from a copolyetherester elastomer, a polyether-block-polyamide, a polyether urethane, a homopolymer of polyvinyl alcohol, a copolymer of polyvinyl alcohol, and mixtures thereof.

58. The process according to claim 57, wherein the hydrophilic polymer is a copolyetherester elastomer, or a mixture of two or more said copolyetherester elastomers, wherein said copolyetherester elastomer comprises a multiplicity of recurring long-chain ester units, and a multiplicity of recurring short chain ester units, said long-chain ester units and short-chain ester units being joined head-to-tail by ester linkages, wherein the long-chain ester

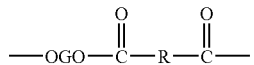

units have the general formula
wherein:
a) G is a divalent radical remaining after terminal hydroxyl groups are removed from a poly(alkylene oxide)glycol having a number average molecular weight of about 400–4000;
b) R is a divalent radical remaining after carboxyl groups are removed from a dicarboxylic acid having a molecular weight less than 300;
wherein the short-chain ester units have the general formula

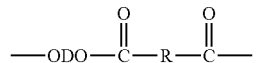

wherein:
a) D is a divalent radical remaining after hydroxyl groups are removed from a diol having a molecular weight less than about 250;
b) R is a divalent radical remaining after carboxyl groups are removed from a dicarboxylic acid having a molecular weight less than 300;
wherein the copolyetherester optionally contains from 0 to 68 wt. % ethylene oxide groups based on the total weight of the copolyetherester, said ethylene oxide groups being contained in the long-chain ester units; and
wherein the copolyetherester contains from about 25 to 80 wt. % of said short-chain ester units.

59. The process according to claim 58, wherein the copolyetherester elastomer having a film thickness of 25 microns has a water vapor transmission rate according to ASTM E96-95 (procedure BW) of at least 400 g/m$^2$/24 hours, said water vapor transmission rate being measured at an air temperature of 23° C., relative humidity of 50% and an air velocity of 3 m/s.

60. The process according to claim 58, wherein the copolyetherester elastomer having a film thickness of 25 microns has a water vapor transmission rate according to ASTM E98-95 (procedure BW) of at least 3500 g/m$^2$/24 hours, said water vapor transmission rate being measured at an air temperature of 23° C., relative humidity of 50% and an air velocity of 3 m/s.

* * * * *